United States Patent
Gluchko et al.

(10) Patent No.: US 12,520,413 B2
(45) Date of Patent: Jan. 6, 2026

(54) SAPPHIRE LAMP FOR LASER SUSTAINED PLASMA BROADBAND LIGHT SOURCE

(71) Applicant: KLA Corporation, Milpitas, CA (US)

(72) Inventors: Sergei Gluchko, San Jose, CA (US); Anatoly Shchemelinin, Bozeman, MT (US); Ilya Bezel, Mountain View, CA (US); Oleg Khodykin, Santa Cruz, CA (US)

(73) Assignee: KLA Corporation, Milpitas, CA (US)

( * ) Notice: Subject to any disclaimer, the term of this patent is extended or adjusted under 35 U.S.C. 154(b) by 0 days.

(21) Appl. No.: 18/884,880

(22) Filed: Sep. 13, 2024

(65) Prior Publication Data

US 2025/0106973 A1  Mar. 27, 2025

Related U.S. Application Data (60) Provisional application No. 63/539,594, filed on Sep. 21, 2023.

(51) Int. Cl.
  *H05G 2/00* (2006.01)

(52) U.S. Cl.
  CPC ............ *H05G 2/002* (2024.08); *H05G 2/003* (2013.01); *H05G 2/0082* (2024.08)

(58) Field of Classification Search
  CPC ....... H05G 2/002; H05G 2/0082; H05G 2/003
  See application file for complete search history.

(56) References Cited

U.S. PATENT DOCUMENTS

| | | |
|---|---|---|
| 5,608,526 A | 3/1997 | Piwonka-Corle et al. |
| 5,999,310 A | 12/1999 | Shafer et al. |
| 6,297,880 B1 | 10/2001 | Rosencwaig et al. |
| 7,525,649 B1 | 4/2009 | Leong et al. |
| 7,957,066 B2 | 6/2011 | Armstrong et al. |
| 2007/0002465 A1 | 1/2007 | Chuang et al. |

(Continued)

FOREIGN PATENT DOCUMENTS

| | | |
|---|---|---|
| WO | 2017100130 A1 | 6/2017 |

OTHER PUBLICATIONS

Korean Intellectual Property Office, International Search Report and Written Opinion received in International Application No. PCT/US2024/047127, Dec. 31, 2024, 6 pages.

*Primary Examiner* — Michael J Logie
*Assistant Examiner* — Hanway Chang
(74) *Attorney, Agent, or Firm* — Suiter Swantz IP (57) ABSTRACT

A laser-sustained broadband light source is disclosed. The light source may include a gas containment structure for plasma generation. The gas containment structure may include a first portion formed from a first grade of sapphire and a second portion formed from a second grade of sapphire. The first portion is coupled to one or more sections of the second portion of second grade sapphire. The light source may include sapphire-to-sapphire bonding between the first-grade sapphire of the first portion and the second-grade sapphire of the second portion, thereby eliminating metal-to-sapphire brazing and avoiding exposure of metal components to destructive UV and/or VUV light. The light source may include a primary laser pump source configured to direct a primary pump beam into the gas containment structure to sustain a plasma and a light collector element configured to collect broadband light emitted from the plasma.

27 Claims, 10 Drawing Sheets

(56) References Cited

U.S. PATENT DOCUMENTS

| | | | |
|---|---|---|---|
| 2011/0205529 A1* | 8/2011 | Gross | H01J 65/06 313/624 |
| 2013/0114085 A1 | 5/2013 | Wang et al. | |
| 2015/0271905 A1 | 9/2015 | Oh et al. | |
| 2021/0092826 A1 | 3/2021 | Bezel et al. | |
| 2021/0321508 A1 | 10/2021 | Bezel et al. | |
| 2022/0165550 A1 | 5/2022 | Kim et al. | |

* cited by examiner

FIG.8

SAPPHIRE LAMP FOR LASER SUSTAINED PLASMA BROADBAND LIGHT SOURCE

CROSS-REFERENCE TO RELATED APPLICATION

The present application claims priority to U.S. Provisional Application Ser. No. 63/539,594, filed Sep. 21, 2023, which is incorporated herein by reference in their entirety.

TECHNICAL FIELD

The present disclosure generally relates to plasma-based broadband light sources, and, more particularly, to a high-power vacuum ultraviolet (VUV) laser-sustained plasma (LSP) light source with a sapphire-based lamp.

BACKGROUND

Laser-sustained plasma (LSP) light sources are widely used in broadband inspection tools for use in semiconductor inspection and imaging. Generally, near-Infrared (NIR) Continuous Wave (CW) pump laser light is focused to a gas-containing vessel, where a plasma is ignited and sustained by absorption of the pump laser radiation. This vessel may be a lamp (e.g., glass bulb with or without electrodes used for plasma ignition), or a cell (e.g., optomechanical assembly with transparent walls to allow laser and plasma radiation in and out of the cell), or a chamber (e.g., metal vessel with transparent windows for laser light input and plasma light output), or similar assembly. The various plasma vessels have high internal pressure, which in operation reaches many tens or over a hundred atmospheres. This high-pressure gas contained in the vessel is crucial for LSP operation. The plasma light is collected through transparent walls or windows of the vessel and is used as an illumination source for inspection tools.

There have been various versions of such sources developed. Most of these sources are designed to operate in the Visible (VIS) or Ultra-Violet (UV) spectral regions. When these sources are used to generate light in the vacuum ultraviolet (VUV) spectral region, and especially in the range of approximately 125-150 nm, the choice of practical constructions is relatively small, and it is limited to relatively low pump powers. A typical source for generating VUV light includes a metal chamber with multiple windows which couple the laser light in and out of the chamber. In some cases, LSP light sources utilize sapphire-based plasma cells for containment and generation of the plasma. In such implementations, the connection between high-quality sapphire and metal is made via brazing. As a result, metal material is situated close to the plasma. Placement of metal near the plasma creates difficulties in thermal management of the light source. For example, 12 kW of plasma radiation generates approximately 1 kW/cm$^2$ irradiance of surfaces. This causes deterioration of brazing materials and overheating of nearby metal components. Moreover, if the metal components are moved further away from the plasma to mitigate thermal management issues, the system requires larger quantities of high-quality sapphire and additional anti-reflective (AR) coating and sapphire surface polishing, significantly increasing the expense of the cell.

Therefore, it would be desirable to provide a VUV broadband light source that overcomes the limitations outlined above.

SUMMARY

A laser-sustained broadband light source is disclosed. In some aspects, the laser-sustained broadband light source includes a gas containment structure configured to contain a gas. In some aspects, the gas containment structure includes a first portion formed from a first grade of sapphire; and a second portion formed from a second grade of sapphire different from the first grade of sapphire. In some aspects, the first portion is coupled to one or more sections of the second portion of second grade sapphire. In some aspects, the light source includes a primary laser pump source, wherein the primary laser pump source is configured to direct a primary pump beam into the gas containment structure to sustain a plasma. In some aspects, the light source includes a light collector element configured to collect at least a portion of broadband light emitted from the plasma.

A characterization system is disclosed. In some aspects, the characterization system includes a laser-sustained light source. In some aspects, the laser-sustained light source includes a gas containment structure configured to contain a gas, wherein the gas containment structure includes: a first portion formed from a first grade of sapphire; and a second portion formed from a second grade of sapphire different from the first grade of sapphire, wherein the first portion is coupled to one or more sections of the second portion of second grade sapphire. In some aspects, the light source includes a primary laser pump source, wherein the primary laser pump source is configured to direct a primary pump beam into the gas containment structure to sustain a plasma; and a light collector element configured to collect at least a portion of broadband light emitted from the plasma. In some aspects, the characterization system further includes a set of illumination optics configured to direct broadband light from the laser-sustained light source to one or more samples; a set of collection optics configured to collect light emanating from the one or more samples; and a detector assembly.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures.

DETAILED DESCRIPTION

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Referring generally to FIGS. 1-7, a sapphire-based VUV laser-sustained plasma broadband light source is described, in accordance with one or more embodiments of the present disclosure.

Embodiments of the present disclosure are directed to an LSP broadband light force implementing a sapphire-based plasma cell constructed of different grades of sapphire materials. Embodiments of the present disclosure utilize sapphire-to-sapphire bonding to bond a first sapphire portion of a first grade of sapphire (e.g., UV grade or VUV grade sapphire) directly to a second sapphire portion (e.g., lower-quality sapphire) and/or a metal component. For instance, the first grade of sapphire may include high-quality optical grade sapphire capable of operating in the UV and VUV spectral ranges, while the second grade of sapphire may include lower-quality non-optical grade sapphire. Additional embodiments of the present disclosure include a first VUV-grade sapphire section connected to long non-VUV grade sapphire pipes (as opposed to metal pipes) to supply high pressure gas to the plasma lamp. This configuration avoids the requirement of metal-to-sapphire brazing and avoids exposing metal-to-sapphire brazing to UV light and high temperatures, resulting in improved mechanical stability of the light source. The various embodiments of the present disclosure allow for non-sapphire elements to be moved away from highly destructive UV/VUV light and improve thermal performance of the light source due to the superior thermal conductivity of sapphire. This configuration results in a higher range of operation temperatures and easier lamp thermal management.

It is noted that the various configurations discussed herein may be arranged in a flow-through configuration, a reverse-vortex flow configuration, or a closed configuration.

Figure 1:
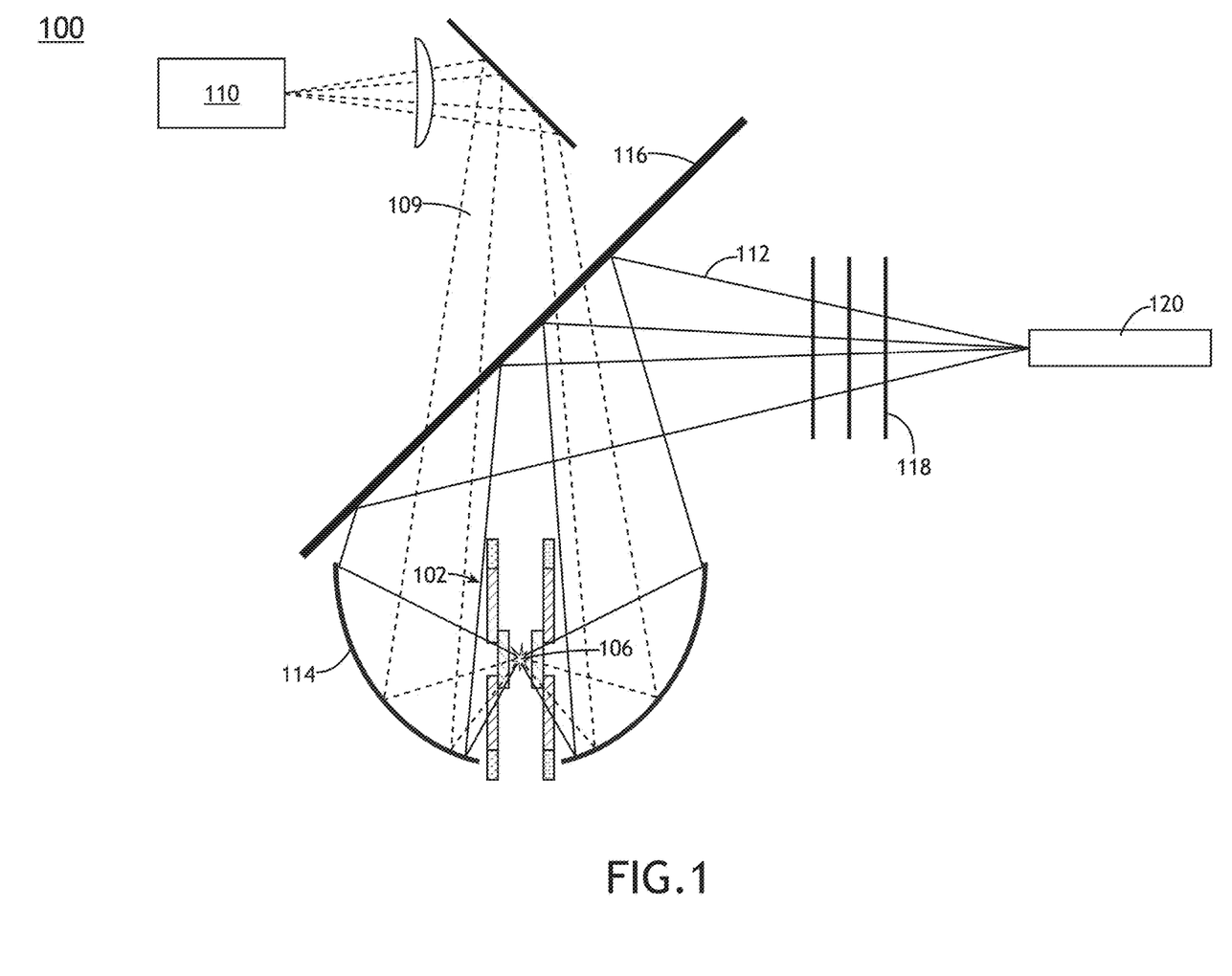
FIG. 1 illustrates a simplified schematic view of a LSP broadband light source including multiple grades of sapphire, in accordance with one or more embodiments of the present disclosure.

FIG. 1 illustrates a schematic view of an LSP broadband light source 100, in accordance with one or more embodiments of the present disclosure. The LSP source 100 includes a plasma lamp (e.g., plasma cell) including a gas containment structure 102. The gas containment structure 102 is configured to contain a gas (e.g., Ar, Xe, or a mixture of gases) and generate a plasma 106 within the gas containment structure 102. In embodiments, the gas containment structure 102 includes a first portion 108 formed from a first grade of sapphire and a second portion 111 formed from a second grade of sapphire different from the first grade of sapphire (e.g., UV-grade or VUV-grade). In embodiments, the first portion 108 is coupled to one or more sections of the second portion of second grade sapphire. The first portion 108 of first-grade sapphire is at least partially transparent to illumination 109 from pump source 110 and the broadband radiation 112 emitted by plasma 106.

The pump source 110 is configured to generate illumination 109, which acts as an optical pump, for sustaining the plasma 106 within the gas containment structure 104. For example, the pump source 110 may emit a beam of laser illumination suitable for pumping the plasma 106. In embodiments, the light collector element 114 is configured to direct a portion of the optical pump to a gas contained in the gas containment structure 104 to ignite and/or sustain the plasma 106. The pump source 110 may include any pump source known in the art suitable for igniting and/or sustaining plasma. For example, the pump source 110 may include one or more lasers (e.g., pump lasers). In embodiments, the laser pump source 110 may include one or more continuous wave (CW) pump lasers and/or one or more pulsed lasers. For example, the laser pump source 106 may include, but is not limited to, a fiber laser, a thin-disk laser, a frequency-doubled laser, or a diode laser. The pump source may include a primary pump source for sustaining the plasma and an ignition source for igniting the plasma. For example, the primary pump source may include one or more CW pump lasers, and the ignition source may include one or more pulsed-lasers. Alternatively, the source 100 may include one or more electrodes for igniting the plasma.

The pump beam may include radiation of any wavelength or wavelength range known in the art including, but not limited to, visible, IR radiation, NIR radiation, and/or UV radiation. The light collector element 114 is configured to collect a portion of broadband radiation 112 emitted from the plasma 106. The broadband radiation 112 emitted from the plasma 106 may be collected via one or more additional optics (e.g., a cold mirror 116) for use in one or more downstream applications (e.g., inspection, metrology, or lithography). The LSP light source 100 may include any number of additional optical elements such as, but not limited to, a filter 118 or a homogenizer 120 for conditioning the broadband radiation 112 prior to the one or more downstream applications. The light collector element 114 may collect one or more of visible, NUV, UV, DUV, and/or VUV radiation emitted by plasma 106 and direct the broadband light 112 to one or more downstream optical elements. For example, the light collector element 114 may deliver infrared, visible, NUV, UV, DUV, and/or VUV radiation to downstream optical elements of any optical characterization system known in the art, such as, but not limited to, an inspection tool, a metrology tool, or a lithography tool. In this regard, the broadband light 112 may be coupled to the illumination optics of an inspection tool, metrology tool, or lithography tool.

Figure 2A:
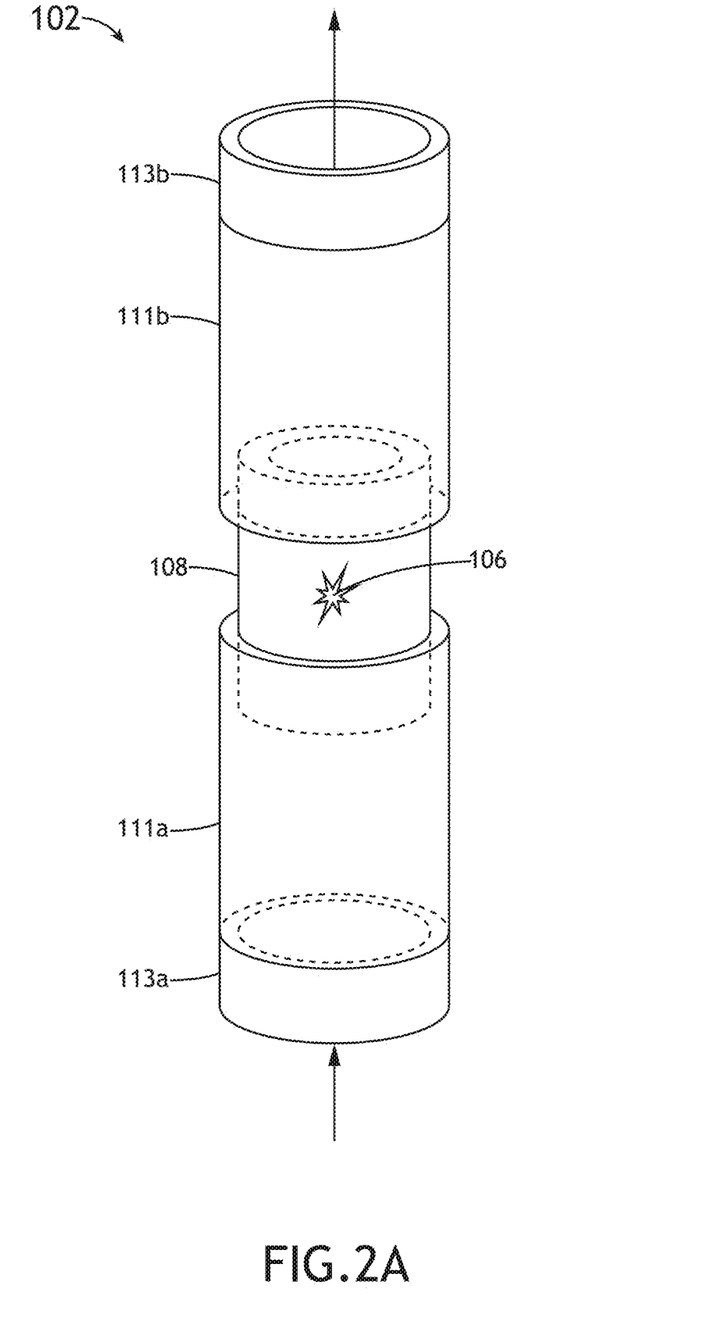
FIG. 2A illustrates an assembled view of a gas containment structure including a first portion of a first grade of sapphire and a second portion of a second grade of sapphire, in accordance with one or more embodiments of the present disclosure.
Figure 2B:
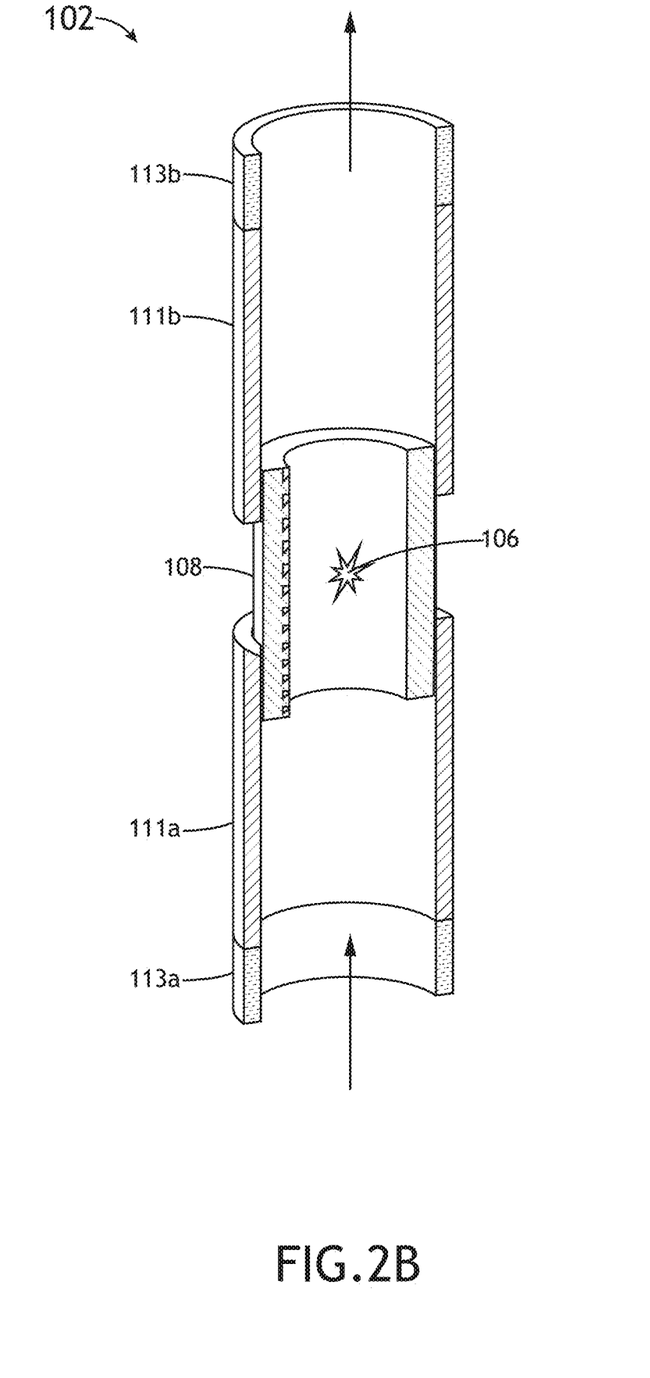
FIG. 2B illustrates a cross-sectional view of a gas containment structure including a first portion of a first grade of sapphire and a second portion of a second grade of sapphire, in accordance with one or more embodiments of the present disclosure.
Figure 2C:
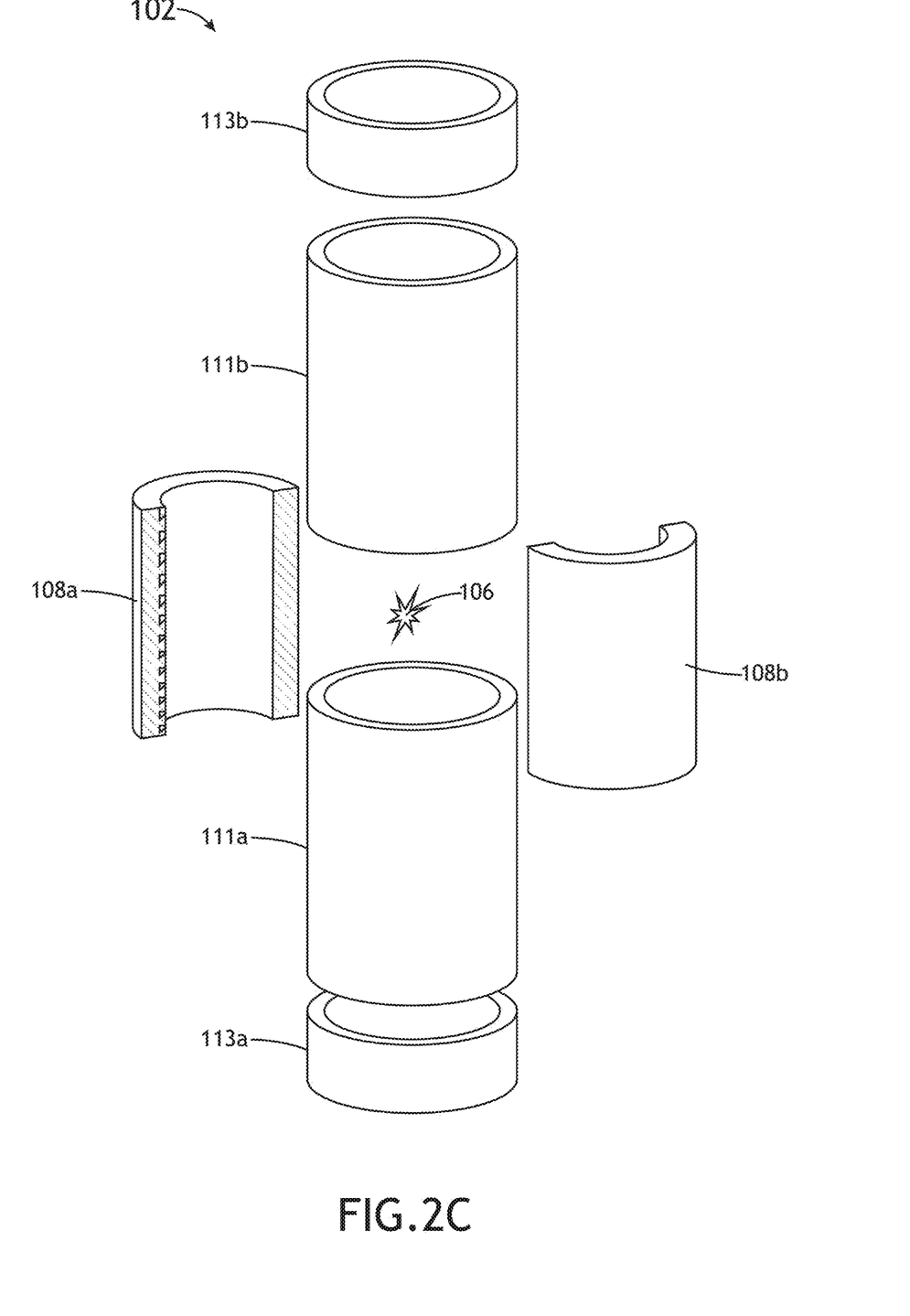
FIG. 2C illustrates an exploded view of a gas containment structure including a first portion of a first grade of sapphire and a second portion of a second grade of sapphire, in accordance with one or more embodiments of the present disclosure.

FIGS. 2A-2C illustrate schematic views of the sapphire-based plasma cell 102, in accordance with one or more embodiments of the present disclosure. FIG. 2A illustrates a top perspective view. FIG. 2B illustrates a cross-sectional view. FIG. 2C illustrates an exploded view. In embodiments, the gas containment structure 102 includes first portion 108 formed from a first grade of sapphire and a second portion 111 formed from a second grade of sapphire different from the first grade of sapphire. In embodiments, the first portion 108 is coupled to one or more sections 111a, 111b of the second portion of second grade sapphire. For example, the first portion 108 of first-grade sapphire may be brazed to the one or more sections 111a, 111b of the second portion of second-grade sapphire. The second portion 111 of the second-grade sapphire may include a first section 111a and a second section 111b. In this regard, the first portion 108 of first-grade sapphire may be brazed to the first section 111a of the second portion of second-grade sapphire and a second section 111b of the second portion of the second-grade sapphire, thereby forming a flow through path with a gas inlet and gas outlet for circulating gas through the first portion 108.

In embodiments, the gas containment structure 102 includes one or more metal pipes 113a, 113b. For example, the one or more metal pipes 113a, 113b may be coupled to one or more sections 111a, 111b of the second portion of the second-grade sapphire. For instance, a first metal pipe 113a may be coupled to a first section 111a of the second portion of second-grade sapphire and a second metal pipe 113b may be coupled to a second section 111b of the second portion of second-grade sapphire. In this configuration, due to the use of the sections 111a, 111b of the second-grade sapphire, the metal pipes 113a, 113b are further removed from the plasma 106 which reduces or eliminates the exposure of the metal to high-UV and/or high-temperature conditions. The metal pipes 113a, 113b may be brazed to the sections 111a, 111b of the second-grade (e.g., low-cost) sapphire. The metal pipes 113a, 113b may be connected to high-pressure gas flow 115 (e.g., high-pressure flow of Ar, Xe, or the like) which is circulated through the gas containment structure.

In embodiments, the first portion 108 of first-grade sapphire includes two or more sections coupled together to form the first portion 108. For example, as shown in FIG. 2C, the first portion 108 of first-grade sapphire includes a first side 108a and a second side 108b. For instance, the first side 108a may be glued, or otherwise affixed, to the second side 108b to form a composite piece that operates as the first portion 108 of first-grade sapphire. Once assembled, the first portion 108 of the first-grade sapphire is connected to one or more sections of the second portion of second-grade sapphire. For example, the first section 111a and the second section 111b of the second portion of second-grade sapphire may be coupled to the first portion 108 of first-grade sapphire. In this regard, the first section 111a and the second section 111b of the second portion of second-grade sapphire act as flanges which reinforce the mechanical coupling of the first side 108a and 108b of the first portion 108 of first-grade sapphire. It is noted that the scope of the present disclosure is not limited to two components of the first portion 10 of first-grade sapphire. It is noted that the first portion 108 may be a single piece or a composite of any number of components (e.g., 1, 2, 3, 4, 5, 6, and so on).

In embodiments, one or more surfaces of the first portion 108 of first-grade sapphire are coated with one or more selected materials. For example, the first portion 108 of the first grade of sapphire may be coated with one or more anti-reflective coating materials. The anti-reflective coating may be deposited on the outside surface of the first portion 108 and/or on the inside surface of the first portion. It is noted that constructing the first portion 108 of first-grade sapphire allows for easier coating and/or polishing of the surface of the first portion 108, particularly the inside portion of the first-grade sapphire. In additional embodiments, the first portion 108 of first-grade sapphire may be coated with one or more filter materials to filter out light incident on the plasma 106 or emitted from the plasma 106.

Figure 3A:
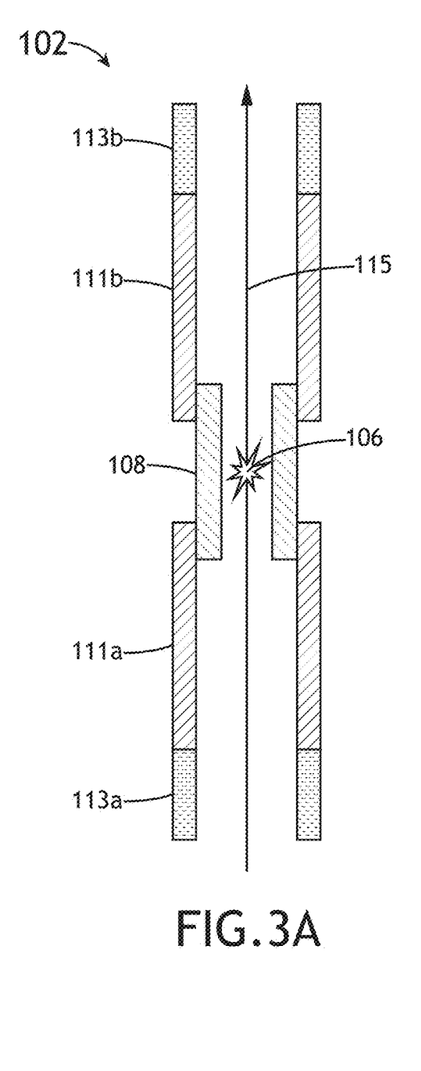
FIGS. 3A-3C illustrate a series of shapes of the first portion of first-grade sapphire, in accordance with one or more embodiments of the present disclosure.
Figure 3B:
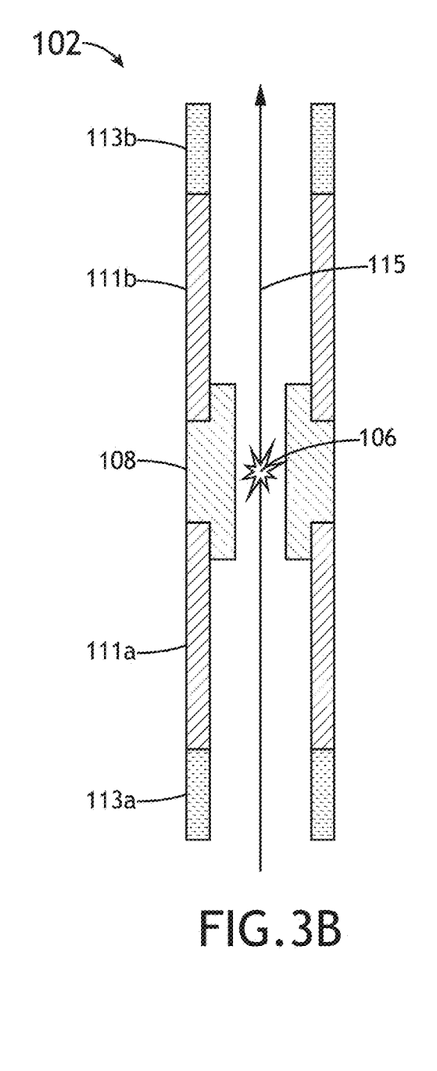
Figure 3C:
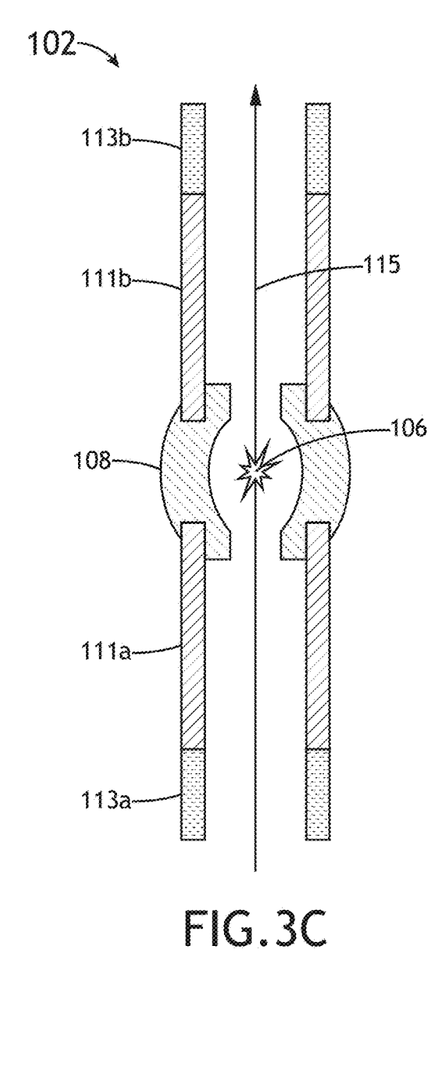

FIGS. 3A-3C illustrate a series of shapes of the first portion 108 of first-grade sapphire, in accordance with one or more embodiments of the present disclosure. It is noted that the first portion 108 of first-grade sapphire may take on any number of shapes. For example, the first portion 108 of first-grade sapphire may include a cylindrically symmetric section. It is noted that any cylindrically-symmetric section may be used within the first portion 108 of first-grade sapphire. In this regard, the shape of the first portion 108 of first grade sapphire may be chosen such that it has a cylindrical symmetry along the gas flow direction 115. In addition, the first grade of sapphire may take on a customized shape/curvature in the direction perpendicular to the direction gas flow (i.e., axis of symmetry) to lower chromatic aberrations and thereby improving the mechanical and optical performance of the light source 100. As shown in FIG. 3A, the first portion 108 of first-grade sapphire may take on a simple cylindrical shape (e.g., cylindrical tube). In this example, the first portion 108 may be sized to fit within the inner radius of the one or more sections 111a, 111b of the second portion (e.g., also cylindrical tube) of second-grade sapphire. Alternatively, the first portion 108 may be sized to fit around the outer radius of the one or more sections 111a, 111b of the second portion of second-grade sapphire.

As shown in FIG. 3B, the first portion 108 of first-grade sapphire may take on a composite cylindrical shape. In this example, the first portion 108 of first-grade sapphire may have a stepped cross-sectional profile such that an outer step fits flush between the sections 111a, 111b of the second-grade sapphire and an inner step extends beyond the opening to provide added mechanical support to the light source 100.

As shown in FIG. 3C, the first portion 108 of first-grade sapphire may include a cylinder with a spheroidal section. It is noted that any type of outwardly curved shape may be implemented within the first portion 108 such as, but not limited to, a spheroidal section or an ellipsoidal section. It is noted that the scope of the present disclosure is not limited to the examples depicted in FIGS. 3A-3C and any shape with one or more cylindrically symmetric sections may be implemented within the first portion 108 and/or second portion 111 of the light source 100.

Figure 4A:
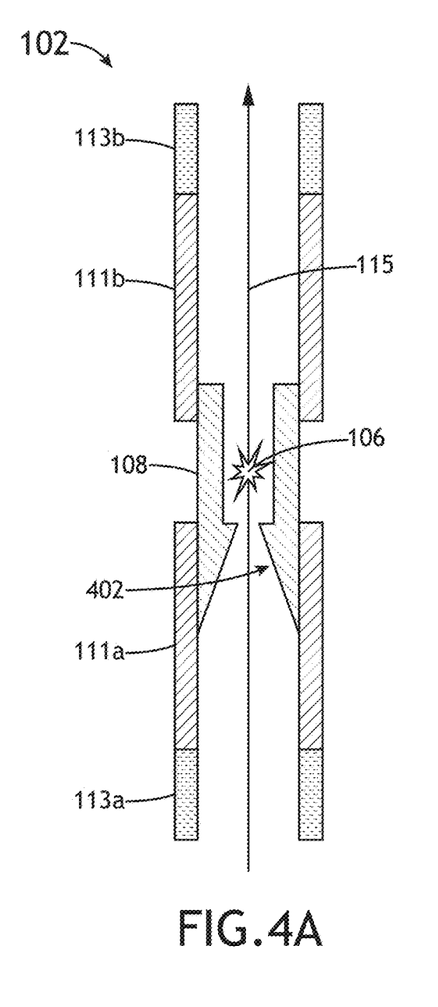
FIGS. 4A-4C illustrate a series of gas containment structures equipped with a gas nozzle, in accordance with one or more embodiments of the present disclosure.
Figure 4B:
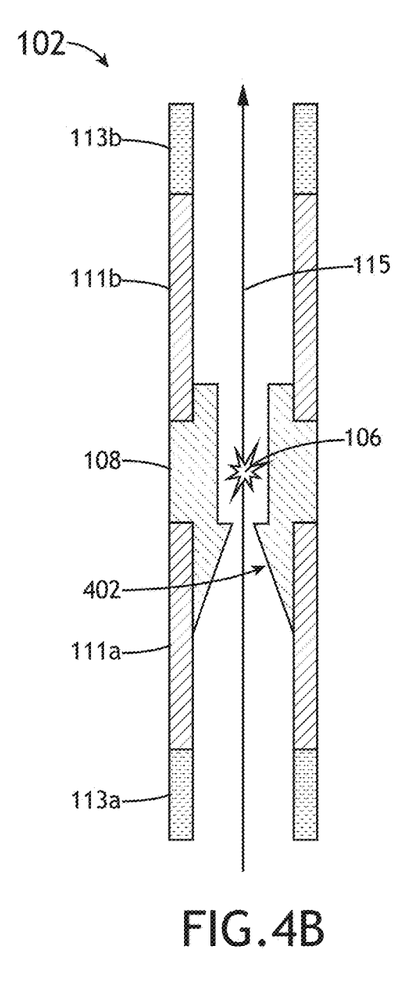
Figure 4C:
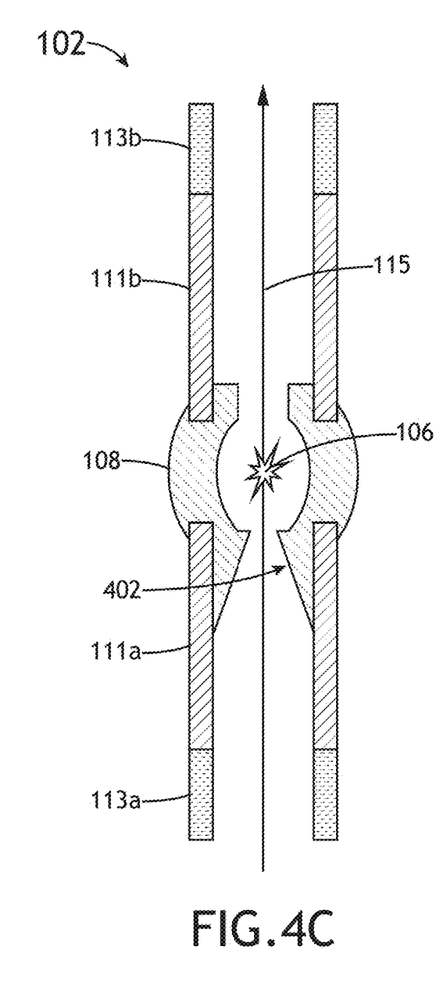

FIGS. 4A-4C illustrate a series of gas containment structures 102 equipped with a gas nozzle, in accordance with one or more embodiments of the present disclosure. In this embodiment, the gas containment structure 102 may include a gas nozzle 402. The gas nozzle 402 may be positioned along the high-pressure gas flow 115 and at the entrance of the plasma-forming region. In embodiments, the gas nozzle 402 may be formed as an integrated piece of the first portion 108 of first-grade sapphire. In this manner, the nozzle 402 and the first portion 108 form a single integrated piece. Alternatively, the gas nozzle 402 may be formed as a separate piece (e.g., first-grade sapphire, second-grade sapphire, or another material) and coupled (e.g., glued) to the first portion 108 of the first-grade sapphire. It is noted that the nozzle 402 may be formed from first-grade sapphire (e.g., VUV-grade sapphire) or second-grade sapphire based on the nozzle positioning and shape. Alternatively, the nozzle 402 may be formed from a non-sapphire material such as, but not limited to, metal, quartz, or glass depending on the operational parameters of the source.

Figure 5:
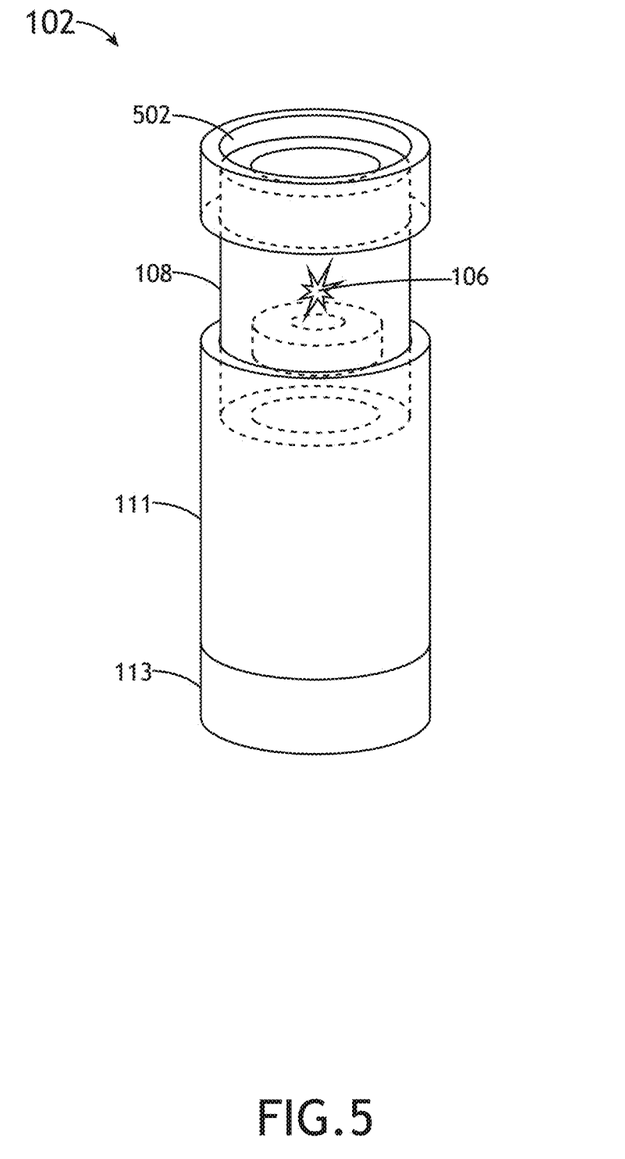
FIG. 5 illustrates a gas containment structure including a sapphire flange, in accordance with one or more embodiments of the present disclosure.

FIG. 5 illustrates a gas containment structure 102 including a sapphire flange, in accordance with one or more embodiments of the present disclosure. In embodiments, gas containment structure 102 may include a cylindrically symmetric tube 111 of second-grade sapphire coupled to a cylindrically-symmetric tube 108 of first-grade sapphire on a first end of the first-grade tube 108. In addition, the gas containment structure 102 may include a sapphire flange 502 coupled to the first grade of sapphire on a second end of the first-grade tube 108. In this example, the gas containment structure 102 may be configured as a closed or open volume. For instance, the second portion 111 of second-grade sapphire may be coupled to a metal tube 113 for receiving a high-pressure gas flow 115. Such an arrangement may be utilized to establish a reverse-vortex gas flow.

Figure 6A:
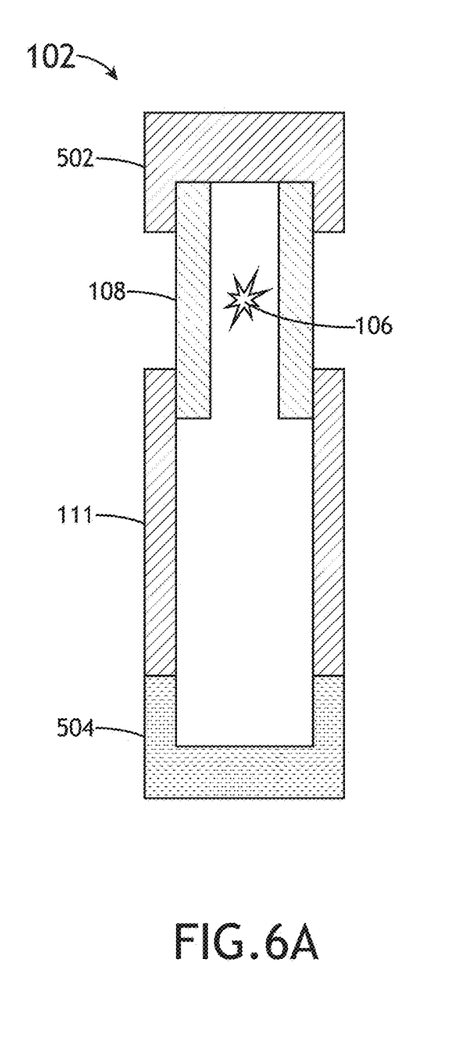
FIGS. 6A-6C illustrate a gas containment structure including a sapphire flange and an additional flange, in accordance with one or more embodiments of the present disclosure.
Figure 6B:
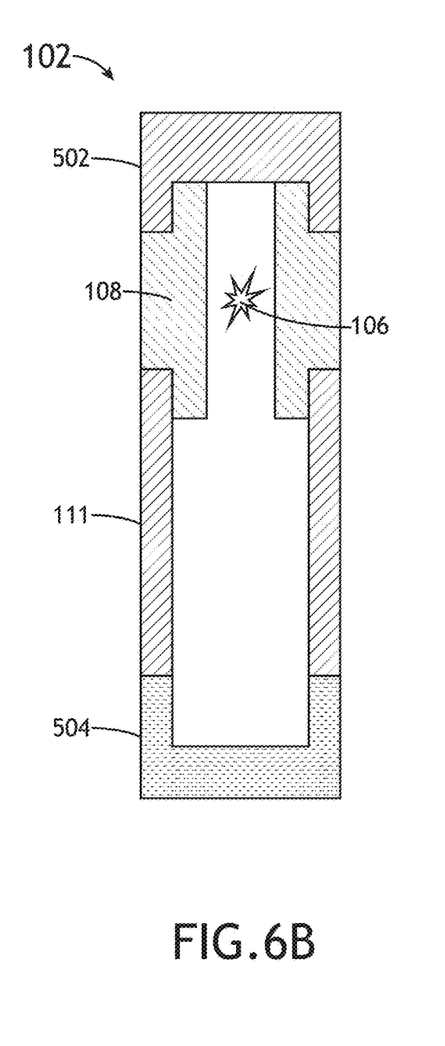
Figure 6C:
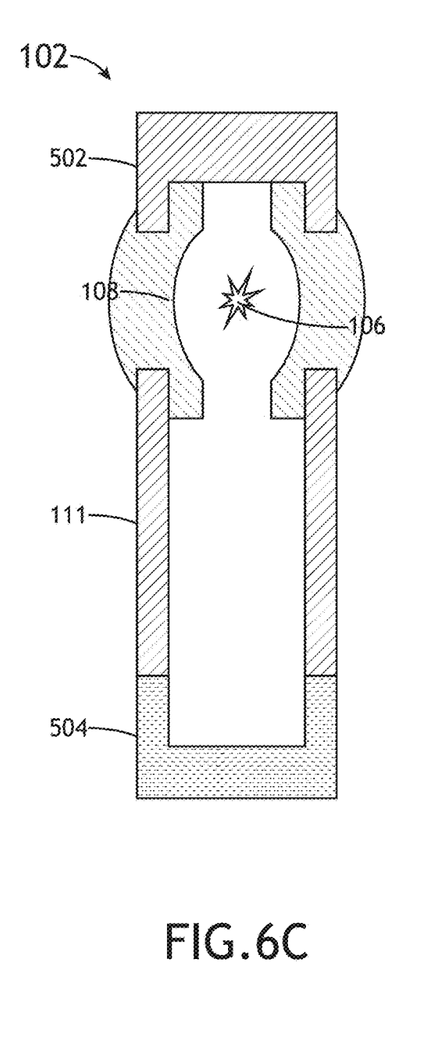

FIGS. 6A-6C illustrate a gas containment structure including a sapphire flange and an additional flange to form a closed volume, in accordance with one or more embodiments of the present disclosure. In embodiments, the gas containment structure 102 may include sapphire flange 502 and an additional flange 504. In this example, the gas containment structure 102 is configured as a closed volume with the additional flange 504 coupled to the second end of the second portion 111 of second-grade sapphire. The second flange 504 may be formed from first-grade sapphire, second-grade sapphire or another material (e.g., metal).

Figure 7:
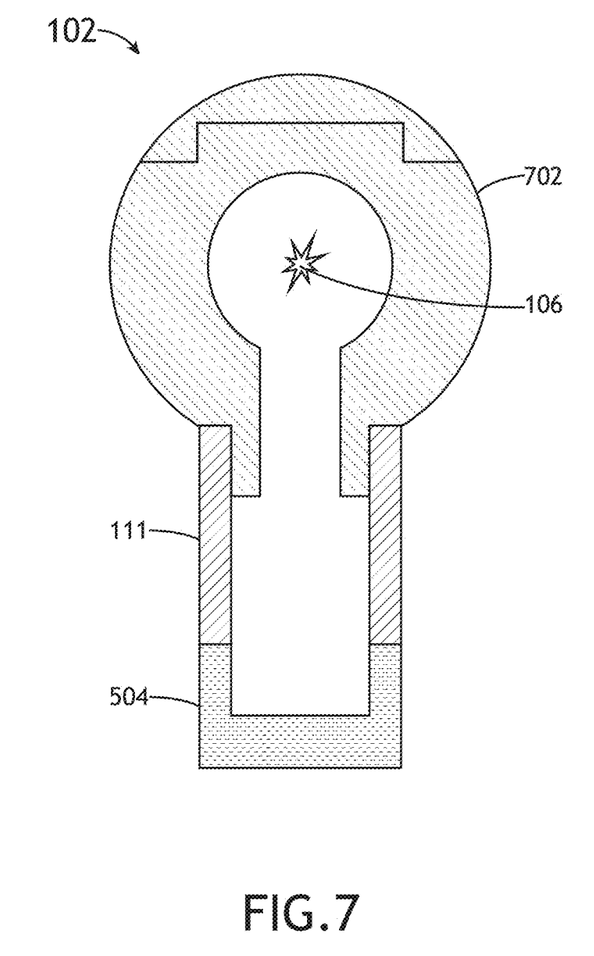
FIG. 7 illustrates a gas containment structure including a terminating bulb, in accordance with one or more embodiments of the present disclosure.

FIG. 7 illustrates a gas containment structure 102 including a terminating bulb 702, in accordance with one or more embodiments of the present disclosure. In this embodiment, the first portion of the first-grade sapphire may comprise a cylindrically symmetric bulb 702 terminating at a first end of the first portion 108. In addition, the second portion 111 of the second grade of sapphire may include a cylindrically symmetric tube coupled to the cylindrically symmetric bulb 702. In this example, the gas containment structure 102 may be configured as an open or closed lamp. In the case of an open configuration, a reverse vortex gas flow may be established. In the case of a closed configuration, the gas containment structure may include an additional flange 504 coupled to a second end of the second portion 111 of the second-grade sapphire.

Figure 8:
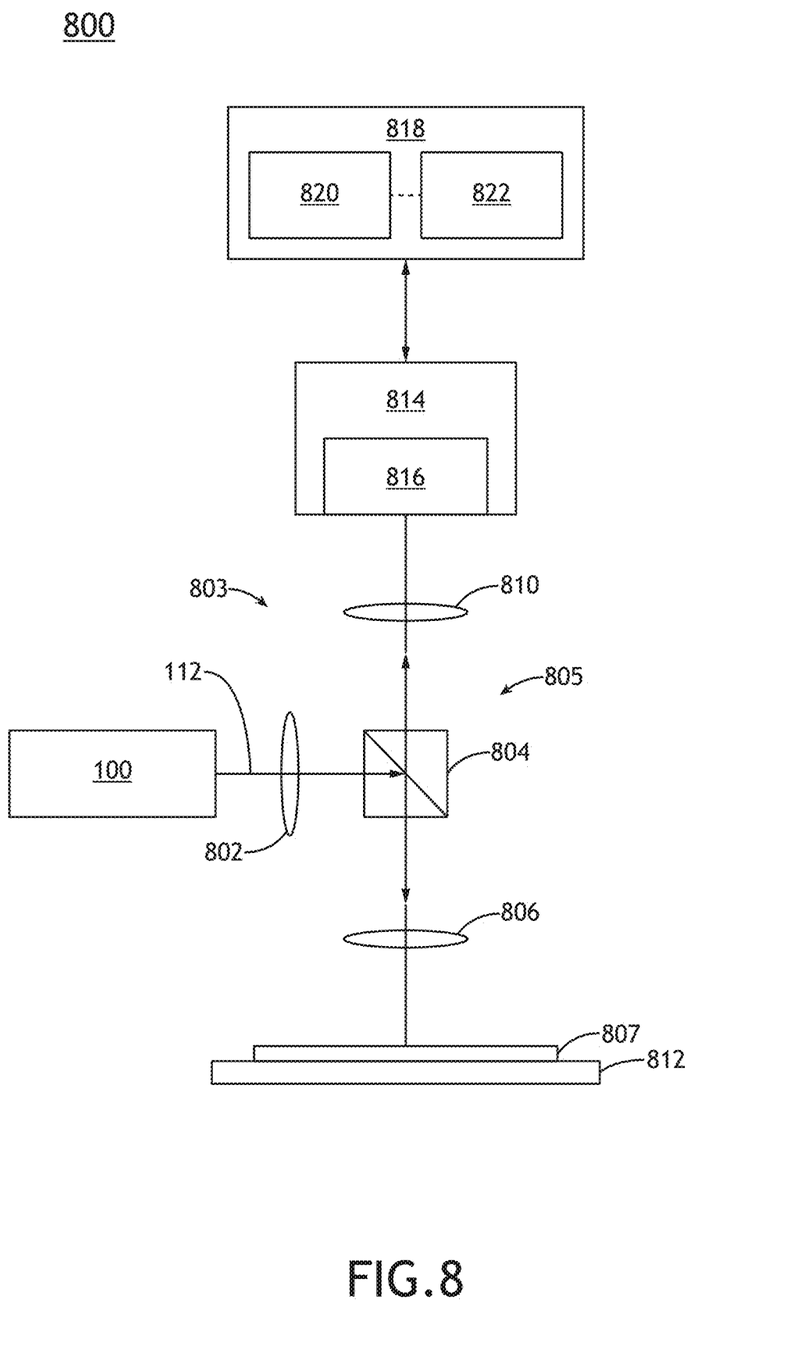
FIG. 8 illustrates a simplified schematic view of an optical characterization system incorporating the LSP broadband light source, in accordance with one or more embodiments of the present disclosure.

FIG. 8 illustrates a simplified schematic view of an optical characterization system 800 incorporating the compact LSP broadband light source, in accordance with one or more alternative and/or additional embodiments. In embodiments, system 800 includes the LSP light source 100, an illumination arm 803, a collection arm 805, a detector assembly 814, and a controller 818 including one or more processors 820 and memory 822.

It is noted herein that system 800 may comprise any imaging, inspection, metrology, lithography, or other characterization system known in the art. In this regard, system 800 may be configured to perform inspection, optical metrology, lithography, and/or any form of imaging on a sample 807. Sample 807 may include any sample known in the art including, but not limited to, a wafer, a reticle, a photomask, a flat panel display, and the like. It is noted that system 800 may incorporate one or more of the various embodiments of the LSP light source 100 described throughout the present disclosure.

In embodiments, sample 807 is disposed on a stage assembly 812 to facilitate movement of sample 807. Stage assembly 812 may include any stage assembly 812 known in the art including, but not limited to, an X-Y stage, an R-θ stage, and the like. In embodiments, stage assembly 812 adjusts the height of sample 807 during inspection or imaging to maintain focus on sample 807.

In embodiments, the illumination arm 803 is configured to direct broadband light 112 from the Broadband LSP light source 100 to the sample 807. The illumination arm 803 may include any number and type of optical components known in the art. In embodiments, the illumination arm 803 includes one or more optical elements 802, a beam splitter 804, and an objective lens 806. In this regard, illumination arm 803 may be configured to focus broadband light 112 from the broadband LSP light source 100 onto the surface of the sample 807. The one or more optical elements 802 may include any optical element or combination of optical elements known in the art including, but not limited to, one or more mirrors, one or more lenses, one or more polarizers, one or more gratings, one or more filters, one or more beam splitters, and the like. It is noted herein that the collection location may include, but is not limited to, one or more of the optical elements 802, a beam splitter 804, or an objective lens 806.

In embodiments, system 800 includes a collection arm 805 configured to collect light reflected, scattered, diffracted, and/or emitted from sample 807. In another embodiment, collection arm 805 may direct and/or focus the light from the sample 807 to a sensor 816 of a detector assembly 814. It is noted that sensor 816 and detector assembly 814 may include any sensor and detector assembly known in the art. The sensor 816 may include, but is not limited to, a CCD sensor or a CCD-TDI sensor. Further, sensor 816 may include, but is not limited to, a line sensor or an electron-bombardment line sensor.

In embodiments, detector assembly 814 is communicatively coupled to a controller 818 including one or more processors 820 and memory 822. For example, the one or more processors 820 may be communicatively coupled to memory 822, wherein the one or more processors 820 are configured to execute a set of program instructions stored on memory 822. In one embodiment, the one or more processors 820 are configured to analyze the output of detector assembly 814. In one embodiment, the set of program instructions are configured to cause the one or more processors 820 to analyze one or more characteristics of sample 807. In another embodiment, the set of program instructions are configured to cause the one or more processors 820 to modify one or more characteristics of system 800 in order to maintain focus on the sample 807 and/or the sensor 818. For example, the one or more processors 820 may be configured to adjust the objective lens 808 or one or more optical elements 802 in order to focus broadband light 117 from broadband LSP light source 100 onto the surface of the sample 807. By way of another example, the one or more processors 820 may be configured to adjust the objective lens 806 and/or one or more optical elements 810 in order to collect illumination from the surface of the sample 807 and focus the collected illumination on the sensor 816.

It is noted that the system 800 may be configured in any optical configuration known in the art including, but not limited to, a dark-field configuration, a bright-field orientation, and the like. The system 800 may be configured as any type of metrology tool known in the art such as, but not limited to, a spectroscopic ellipsometer with one or more angles of illumination, a spectroscopic ellipsometer for measuring Mueller matrix elements (e.g., using rotating compensators), a single-wavelength ellipsometer, an angle-resolved ellipsometer (e.g., a beam-profile ellipsometer), a spectroscopic reflectometer, a single-wavelength reflectometer, an angle-resolved reflectometer (e.g., a beam-profile reflectometer), an imaging system, a pupil imaging system, a spectral imaging system, or a scatterometer.

Additional details of various embodiments of optical characterization system 800 are described in U.S. Published U.S. Pat. No. 7,957,066B2, entitled "Split Field Inspection System Using Small Catadioptric Objectives," issued on Jun. 7, 2011; U.S. Published Patent Application 2007/0002465, entitled "Beam Delivery System for Laser Dark-Field Illumination in a Catadioptric Optical System," published on Jan. 4, 2007; U.S. Pat. No. 5,999,310, entitled "Ultra-broadband UV Microscope Imaging System with Wide Range Zoom Capability," issued on Dec. 7, 1999; U.S. Pat. No. 7,525,649 entitled "Surface Inspection System Using Laser Line Illumination with Two Dimensional Imaging," issued on Apr. 28, 2009; U.S. Published Patent Application 2013/0114085, entitled "Dynamically Adjustable Semiconductor Metrology System," by Wang et al. and published on May 9, 2013; U.S. Pat. No. 5,608,526, entitled "Focused Beam Spectroscopic Ellipsometry Method and System, by Piwonka-Corle et al., issued on Mar. 4, 1997; and U.S. Pat. No. 6,297,880, entitled "Apparatus for Analyzing Multi-Layer Thin Film Stacks on Semiconductors," by Rosencwaig et al., issued on Oct. 2, 2001, which are each incorporated herein by reference in their entirety.

The one or more processors 820 of the present disclosure may include any one or more processing elements known in the art. In this sense, the one or more processors 820 may include any microprocessor-type device configured to execute software algorithms and/or instructions. In one embodiment, the one or more processors 820 may consist of a desktop computer, mainframe computer system, workstation, image computer, parallel processor, or other computer system (e.g., networked computer) configured to execute a program configured to operate the system 800 and/or Broadband LSP light source 100, as described throughout the present disclosure. It should be recognized that the steps described throughout the present disclosure may be carried out by a single computer system or, alternatively, multiple computer systems. In general, the term "processor" may be broadly defined to encompass any device having one or more processing elements, which execute program instructions from a non-transitory memory medium 822. Moreover, different subsystems of the various systems disclosed may include processor or logic elements suitable for carrying out at least a portion of the steps described throughout the present disclosure. Therefore, the above description should not be interpreted as a limitation on the present disclosure but merely an illustration.

The memory medium 822 may include any storage medium known in the art suitable for storing program instructions executable by the associated one or more processors 820. For example, the memory medium 822 may include a non-transitory memory medium. For instance, the memory medium 822 may include, but is not limited to, a read-only memory, a random-access memory, a magnetic or optical memory device (e.g., disk), a magnetic tape, a solid-state drive, and the like. In another embodiment, the memory 822 is configured to store one or more results and/or outputs of the various steps described herein. It is further noted that memory 822 may be housed in a common controller housing with the one or more processors 820. In an alternative embodiment, the memory 822 may be located remotely with respect to the physical location of the processors 820. For instance, the one or more processors 820 may access a remote memory (e.g., server), accessible through a network (e.g., internet, intranet, and the like). In another embodiment, memory medium 822 maintains program instructions for causing the one or more processors 820 to carry out the various steps described through the present disclosure.

One skilled in the art will recognize that the herein described components, operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

The invention claimed is:

1. A laser-sustained broadband light source comprising:
   a gas containment structure configured to contain a gas wherein the gas containment structure comprises:
   a first portion formed from a first grade of sapphire;
   a second portion formed from a second grade of sapphire different from the first grade of sapphire,
   wherein the first portion is coupled to one or more sections of the second portion of second grade sapphire,
   wherein the first portion formed from the first grade of sapphire comprises a cylindrically-symmetric tube,
   wherein the second portion formed from the second grade of sapphire comprises one or more cylindrically-symmetric tubes;
   a primary laser pump source, wherein the primary laser pump source is configured to direct a primary pump beam into the gas containment structure to sustain a plasma; and
   a light collector element configured to collect at least a portion of broadband light emitted from the plasma.

2. The broadband light source of claim 1, wherein the first portion of the first grade of sapphire is brazed to one or more sections of the second portion of second grade sapphire.

3. The broadband light source of claim 2, wherein the first portion of the first grade of sapphire is brazed to a first section of the second portion of second grade sapphire and a second section of the second portion of second grade sapphire.

4. The broadband light source of claim 1, wherein the first portion of the first grade of sapphire comprises a first side and a second side, wherein the first side is glued to the second side.

5. The broadband light source of claim 1, wherein one or more surfaces of the first portion of the first grade of sapphire are coated with one or more selected materials.

6. The broadband light source of claim 5, wherein the first portion of the first grade of sapphire is coated with one or more anti-reflective materials.

7. The broadband light source of claim 1, further comprising one or more metal pipes coupled to one or more sections of the second portion of the second grade of sapphire.

8. The broadband light source of claim 1, wherein the second portion of the second grade of sapphire comprises a first cylindrically-symmetric tube coupled to the cylindrically-symmetric tube of a first grade of sapphire on a first end and a second cylindrically-symmetric tube coupled to the cylindrically-symmetric tube of the first grade of sapphire on a second end.

9. The broadband light source of claim 1, wherein the second portion of the second grade of sapphire comprises a first cylindrically-symmetric tube coupled to the cylindrically-symmetric tube of the first grade of sapphire on a first end and a sapphire flange coupled to a first portion of the first grade of sapphire on a second end of the first portion.

10. The broadband light source of claim 9, further comprising an additional flange coupled to an end of the second portion of the second grade of sapphire to form a closed volume.

11. The broadband light source of claim 1, wherein a first end of the cylindrically-symmetric tube of the first sapphire grade includes a sapphire gas nozzle.

12. The broadband light source of claim 1, wherein the cylindrically-symmetric tube of the first sapphire grade comprises a cylinder.

13. The broadband light source of claim 1, wherein the cylindrically-symmetric tube of the first sapphire grade comprises a cylinder with a spheroidal section.

14. The broadband light source of claim 1, wherein the cylindrically-symmetric tube of the first sapphire grade comprises a cylinder with an ellipsoidal section.

15. The broadband light source of claim 1, wherein the first portion of the first grade of sapphire comprises a cylindrically-symmetric bulb terminating at a first end.

16. The broadband light source of claim 15, wherein the second portion of the second grade of sapphire comprises a cylindrically-symmetric tube coupled to the cylindrically-symmetric bulb.

17. The broadband light source of claim 16, further comprising an additional flange coupled to an end of the second portion of the second grade of sapphire to form a closed volume.

18. The broadband light source of claim 1, wherein the gas containment structure is configured as gas flow-through cell.

19. The broadband light source of claim 1, wherein the gas containment structure is configured as a reverse-vortex-flow-through cell.

20. The broadband light source of claim 1, wherein the gas containment structure is configured as a closed static cell.

21. The broadband light source of claim 1, wherein the light collect element comprises at least one of a mirror or lens.

22. The broadband light source of claim 21, where in the light collector element comprises a reflector assembly.

23. The broadband light source of claim 22, wherein the light collector element comprises at least one of an elliptical reflector assembly or a spherical reflector assembly.

24. The broadband light source of claim 1, wherein the primary pump laser source comprises one or more continuous wave (CW) lasers.

25. The broadband light source of claim 1, further comprising: a pulsed ignition laser source, wherein the pulsed ignition laser source is configured to direct a pulsed laser beam into the gas to ignite the plasma.

26. A plasma lamp comprising:
a gas containment structure configured to contain a gas, wherein the gas containment structure comprises:
a first portion formed from a first grade of sapphire;
a second portion formed from a second grade of sapphire different from the first grade of sapphire,
wherein the first portion is coupled to one or more sections of the second portion of second grade sapphire, wherein the first portion formed from the first grade of sapphire comprises a cylindrically-symmetric tube, wherein the second portion formed from the second grade of sapphire comprises one or more cylindrically-symmetric tubes,
wherein at least the first portion is transparent to illumination from a pump laser and at least a portion of broadband light from a plasma generated within the gas containment structure.

27. A characterization system comprising:
a laser-sustained light source comprising:
a gas containment structure configured to contain a gas, wherein the gas containment structure comprises:
a first portion formed from a first grade of sapphire;
a second portion formed from a second grade of sapphire different from the first grade of sapphire,
wherein the first portion is coupled to one or more sections of the second portion of second grade sapphire, wherein the first portion formed from the first grade of sapphire comprises a cylindrically-symmetric tube, wherein the second portion formed from the second grade of sapphire comprises one or more cylindrically-symmetric tubes;
a primary laser pump source, wherein the primary laser pump source is configured to direct a primary pump beam into the gas containment structure to sustain a plasma; and
a light collector element configured to collect at least a portion of broadband light emitted from the plasma,
wherein the characterization system further comprises:
a set of illumination optics configured to direct broadband light from the laser-sustained light source to one or more samples;
a set of collection optics configured to collect light emanating from the one or more samples; and
a detector assembly.

* * * * *